United States Patent
Takechi (10) Patent No.: US 10,309,841 B2
(45) Date of Patent: Jun. 4, 2019

(54) TEMPERATURE DETECTING APPARATUS

(71) Applicant: Sumitomo Electric Industries, Ltd., Osaka-shi (JP)

(72) Inventor: Hiroaki Takechi, Osaka (JP)

(73) Assignee: SUMITOMO ELECTRIC INDUSTRIES, LTD., Osaka-Shi (JP)

( * ) Notice: Subject to any disclaimer, the term of this patent is extended or adjusted under 35 U.S.C. 154(b) by 138 days.

(21) Appl. No.: 15/526,252

(22) PCT Filed: Oct. 1, 2015

(86) PCT No.: PCT/JP2015/077939
§ 371 (c)(1),
(2) Date: May 11, 2017

(87) PCT Pub. No.: WO2016/076029
PCT Pub. Date: May 19, 2016

(65) Prior Publication Data
US 2017/0328786 A1 Nov. 16, 2017

(30) Foreign Application Priority Data
Nov. 11, 2014 (JP) .................. 2014-228762

(51) Int. Cl.
*G01K 7/22* (2006.01)
*G01K 7/25* (2006.01)
*H01C 7/00* (2006.01)

(52) U.S. Cl.
CPC .......... *G01K 7/22* (2013.01); *G01K 7/25* (2013.01); *H01C 7/008* (2013.01); *G01K 2219/00* (2013.01)

(58) Field of Classification Search
CPC ........ G01K 7/22; G01K 7/25; G01K 2219/00; H01C 7/008; G05D 23/20
See application file for complete search history.

(56) References Cited

U.S. PATENT DOCUMENTS 2,884,786 A * 5/1959 Burk .................. G01K 7/30
324/613
2,971,379 A * 2/1961 Weisheit .................. G01K 7/24
374/183
(Continued)

FOREIGN PATENT DOCUMENTS

CN    1291715 A    4/2001
JP    05-045231    2/1993
(Continued)

OTHER PUBLICATIONS

First Office Action issued in counterpart CN Patent Application No. 201580057320.3, dated Dec. 4, 2018 w/English Translation.

*Primary Examiner* — Harshad R Patel
*Assistant Examiner* — Philip L Cotey
(74) *Attorney, Agent, or Firm* — Baker Botts L.L.P.; Michael A. Sartori (57) ABSTRACT

A temperature detecting apparatus includes a thermistor; a resistor connected in series to the thermistor; a temperature detector connected to a first node between the thermistor and the resistor; and a switch circuit including a first switch, a second switch, a third switch, and a fourth switch. The first switch and the third switch are connected in series, the second switch and the fourth switch are connected in series, the first switch and the second switch are connected to a power side, the third switch and the fourth switch are connected to a ground side, the thermistor is connected to a second node between the first switch and the third switch, and the resistor is connected to a third node between the second switch and the fourth switch.

4 Claims, 9 Drawing Sheets

(56) References Cited

U.S. PATENT DOCUMENTS

| | | | | |
|---|---|---|---|---|
| 4,092,852 A * | 6/1978 | Fowler | | G01D 5/16 340/870.13 |
| 4,122,322 A * | 10/1978 | Ohkubo | | G01K 3/005 219/712 |
| 4,129,833 A * | 12/1978 | Shibata | | G01D 5/248 324/707 |
| 4,364,234 A * | 12/1982 | Reed | | F25B 21/02 165/265 |
| 4,686,998 A * | 8/1987 | Robbins | | A61B 5/0006 128/903 |
| 5,453,682 A * | 9/1995 | Hinrichs | | G01K 7/25 324/119 |
| 5,467,287 A * | 11/1995 | Wenner | | G01K 17/06 236/44 C |
| 5,748,429 A * | 5/1998 | Peterson | | G01K 15/00 219/484 |
| 8,730,701 B2 * | 5/2014 | Skirda | | G05D 23/20 363/132 |
| 9,182,295 B1 * | 11/2015 | Perrott | | G01K 7/226 |
| 2007/0029976 A1 * | 2/2007 | Garcia | | G01K 1/026 320/150 |
| 2009/0110028 A1 * | 4/2009 | Goh | | G01K 3/005 374/185 |
| 2010/0202172 A1 * | 8/2010 | Skirda | | G05D 23/1909 363/89 |
| 2010/0259313 A1 * | 10/2010 | Li | | G01K 3/005 327/512 |
| 2011/0038396 A1 * | 2/2011 | Yi | | G01K 7/01 374/171 |
| 2011/0291869 A1 * | 12/2011 | Utsuno | | G01K 7/24 341/132 |
| 2012/0139420 A1 * | 6/2012 | Lee | | H05B 33/0815 315/122 |
| 2015/0219503 A1 * | 8/2015 | Yoshida | | G01K 7/24 374/170 |

FOREIGN PATENT DOCUMENTS

| | | |
|---|---|---|
| JP | 09-210808 A | 8/1997 |
| JP | 2009-121825 A | 6/2009 |

* cited by examiner

TEMPERATURE DETECTING APPARATUS

TECHNICAL FIELD

The present invention relates to a temperature detecting apparatus including a thermistor.

BACKGROUND ART

In a temperature detecting apparatus including a thermistor, it is preferable to supply regulated power to the thermistor. However, the output voltage of a regulator that supplies power to the thermistor normally varies, and the impact of such variation on the thermistor varies with temperature. This means that the accuracy of temperature measurement varies depending on the temperature range.

Accordingly, Patent Literature (PTL) 1 proposes a technique in which to achieve accurate temperature detection in a wide range of temperatures, resistors are connected to both ends of a thermistor and switched from one to the other in accordance with the level (Hi or Lo) of a pulse signal. A voltage divided into two types, one for the high temperature side and the other for the low temperature, can thus be output from the thermistor.

Patent Literature 2 proposes a technique in which, in a temperature detecting circuit including a thermistor and a voltage-dividing resistor connected in series thereto, a temperature detecting unit is connected to a node between a temperature sensor and the voltage-dividing resistor and a series circuit of a resistor and a switch is connected in parallel to the thermistor or the voltage-dividing resistor. Patent Literature 3 proposes a temperature measuring apparatus that includes a series circuit composed of a thermistor and a main reference resistor, and an auxiliary reference resistor connected in parallel to the main reference resistor with a switching element interposed therebetween.

A memory means included in the temperature measuring apparatus disclosed in Patent Literature 3 has first and second temperature tables that contain data for low and high temperatures. In accordance with the output voltage of the thermistor, the first and second temperature tables are switched and the switching element is turned on or off.

CITATION LIST

Patent Literature

PTL 1: Japanese Unexamined Patent Application Publication No. 9-210808
PTL 2: Japanese Unexamined Patent Application Publication No. 2009-121825
PTL 3: Japanese Unexamined Patent Application Publication No. 5-45231

SUMMARY OF INVENTION

Technical Problem

In a temperature detecting circuit disclosed in Patent Literature 1, where the resistor connected in series to the thermistor is changed by turning on or off the switch, there is no continuity of measurement accuracy in a measurement temperature range. That is, the measurement accuracy (temperature measurement error) becomes discontinuous at a temperature in the measurement temperature range. Additionally, since the thermistor is connected and secured to the ground side, errors caused by variation in supply voltage cannot be reduced.

In the temperature detecting circuit disclosed in Patent Literature 2 and the temperature measuring apparatus disclosed in Patent Literature 3, where the resistor connected in series is also changed by turning on or off the switch, there is no continuity of measurement accuracy in the measurement temperature range.

Solution to Problem

An aspect of the present invention relates to a temperature detecting apparatus that includes a thermistor; a resistor connected in series to the thermistor; a temperature detector connected to a first node between the thermistor and the resistor; and a switch circuit including a first switch, a second switch, a third switch, and a fourth switch. The first switch and the third switch are connected in series, the second switch and the fourth switch are connected in series, the first switch and the second switch are connected to a power side, the third switch and the fourth switch are connected to a ground side, the thermistor is connected to a second node between the first switch and the third switch, and the resistor is connected to a third node between the second switch and the fourth switch.

Advantageous Effects of Invention

According to the aspect of the present invention, it is possible to provide a temperature detecting apparatus that can achieve accurate temperature detection in a wide temperature range.

DESCRIPTION OF EMBODIMENTS

Description of Embodiments of the Invention

First, embodiments of the invention are listed below.

In the following description, a first switch, a second switch, a third switch, and a fourth switch will also be referred to as a switch Sw1, a switch Sw2, a switch Sw3, and a switch Sw4, respectively.

(1) A temperature detecting apparatus according to the present embodiment includes a thermistor; a resistor connected in series to the thermistor (i.e., a resistor having a predetermined resistance value Ra, hereinafter also referred to as a resistor Ra); a temperature detector connected to a first node between the thermistor and the resistor Ra; and a switch circuit including a switch Sw1, a switch Sw2, a switch Sw3, and a switch Sw4. In the switch circuit, the switch Sw1 and the switch Sw3 are connected in series, and the switch Sw2 and the switch Sw4 are connected in series. The switch Sw1 and the switch Sw2 are connected to a power side, and the switch Sw3 and the switch Sw4 are connected to a ground side. The thermistor is connected to a second node between the switch Sw1 and the switch Sw3. The resistor Ra is connected to a third node between the switch Sw2 and the switch Sw4. That is, the second node, the thermistor, the resistor Ra, and the third node are arranged in this order on an electrical line.

In the temperature detecting apparatus described above, controlling the four switches Sw1 to Sw4 makes it possible to make a switch between a state where the thermistor is connected to the power side and the resistor Ra is connected to the ground side, and a state where the thermistor is connected to the ground side and the resistor Ra is connected to the power side. Thus, for example, without supplying highly regulated power using a high-performance regulator, accurate temperature detection can be achieved in a wide temperature range. Also, since switch elements are available at low prices, a high-performance temperature detecting apparatus can be provided at low cost.

(2) The temperature detecting apparatus preferably further includes a switch controller configured to switch each of the switch Sw1, the switch Sw2, the switch Sw3, and the switch Sw4 between an on-state and an off-state with an independent control signal.

(3) If a temperature of the thermistor is higher than or equal to a predetermined threshold temperature (i.e., in a high temperature range), the switch controller controls the switch circuit to be in a first state. In the first state, the switch Sw2 and the switch Sw3 are in the on-state, and the switch Sw1 and the switch Sw4 are in the off-state.

On the other hand, if the temperature of the thermistor is lower than the predetermined threshold temperature (i.e., in a low temperature range), the switch controller controls the switch circuit to be in a second state. In the second state, the switch Sw1 and the switch Sw4 are in the on-state, and the switch Sw2 and the switch Sw3 are in the off-state.

(4) When the switch circuit is in the first state, the relationship between the potential at the first node and the temperature of the thermistor is shown by a first characteristic diagram. When the switch circuit is in the second state, the relationship between the potential at the first node and the temperature of the thermistor is shown by a second characteristic diagram. When the first characteristic diagram and the second characteristic diagram are combined into a single diagram, a temperature (hereinafter referred to as an intersection temperature) at an intersection of a curve representing the relationship between the potential at the first node and the temperature of the thermistor in the first characteristic diagram and a curve representing the relationship between the potential at the first node and the temperature of the thermistor in the second characteristic diagram is defined as T $°$ C. That is, the intersection temperature is a temperature at which the potential at the first node in the first state of the switch circuit is equal to the potential at the first node in the second state of the switch circuit.

The threshold temperature is preferably a temperature ranging from T−5° C. to T+5° C., more preferably a temperature ranging from T−1° C. to T+1° C., and is even more preferably T $°$ C. It is thus possible to achieve more accurate temperature detection in a wide temperature range.

(5) In a preferred embodiment, the temperature detector includes an A/D converter (analog-to-digital converter: ADC) configured to convert a potential at the first node between the thermistor and the resistor Ra into a digital value, and a temperature output unit. The A/D converter outputs the digital value to the temperature output unit. The temperature output unit identifies a first temperature and a second temperature from the digital value, and selects and outputs one of the first temperature and the second temperature on the basis of the state of the switch circuit. When the temperature of the thermistor is the intersection temperature (T $°$ C.), the first and second temperatures identified are the same. In this case, either of the first and second temperatures can be output.

The first temperature is, in a first data table based on the curve representing the relationship between the potential at the first node and the temperature of the thermistor in the first state of the switch circuit, a temperature corresponding to the digital value output by the A/D converter. The second temperature is, in a second data table based on the curve representing the relationship between the potential at the first node and the temperature of the thermistor in the second state of the switch circuit, a temperature corresponding to the digital value output by the A/D converter.

When the threshold temperature is the intersection temperature (T $°$ C.), the temperature of the thermistor is any temperature other than the intersection temperature (T $°$ C.), and the digital value output by the A/D converter is less than the potential at the first node at T $°$ C., the first temperature is a temperature in a high temperature range higher than or equal to the threshold temperature and the second temperature is a temperature in a low temperature range lower than the threshold temperature. In this case, the temperature output unit identifies the first temperature in the high temperature range and the second temperature in the low temperature range.

In the temperature detecting apparatus, the thermistor is preferably disposed near an object whose temperature is to be measured (temperature measured object). The thermistor has a resistance value Rth which reflects the temperature of the temperature measured object, and the resistance value Rth is reflected in an output voltage Vth from the first node to the A/D converter (i.e., potential at the first node).

The temperature detecting apparatus is applicable to various monitoring apparatuses that monitor temperatures (i.e., temperature monitoring apparatuses). For example, the temperature detecting apparatus can be used to monitor the temperatures of batteries, electrical devices, and electronic devices.

The temperature detecting apparatus is also applicable, for example, to electricity storage device monitoring apparatuses. The electricity storage device monitoring apparatuses are required to have the function of monitoring the temperature of an electricity storage device. The electricity storage device is not limited to a particular type, but the temperature detecting apparatus is suitable to be applied to lithium-ion capacitor monitoring apparatuses. This is because since lithium-ion capacitors exhibit excellent charge-discharge characteristics even at temperatures, for example, as low as 0° C. or below, the lithium-ion capacitor monitoring apparatuses are assumed to be used at temperatures ranging from as low as about −40° C. to as high as about 80° C. The measurement temperature range of the temperature detecting apparatus is not particularly limited, but is, for example, from −40° C. to +100° C., and is preferably from −40° C. to +120° C.

DETAILS OF EMBODIMENTS OF THE INVENTION

Embodiments of the present invention will now be concretely described. Note that the present invention is not limited to the following description, but is defined by the claims and intended to include all changes within the meaning and scope equivalent to the claims.

In the present embodiment, "node" between A and B refers to any point on an electrical connection line between A and B. "Power side" of the switch circuit refers to any point on the power supply side (Vcc side) where the potential is highest in the switch circuit during temperature detection, and "ground side" of the switch circuit refers to any point on the side where the potential is lowest in the switch circuit during temperature detection.

For example, "the thermistor is connected to the power side and the resistor Ra is connected to the ground side" means that during temperature detection, the thermistor is positioned closer to the high potential side than the resistor Ra is. Conversely, "the thermistor is connected to the ground side and the resistor Ra is connected to the power side" means that during temperature detection, the thermistor is positioned closer to the low potential side than the resistor Ra is. "The switch is connected to the power side" means that during temperature detection, the switch is positioned closer to the power side than the thermistor and the resistor Ra are, and "the switch is connected to the ground side" means that during temperature detection, the switch is positioned closer to the ground side than the thermistor and the resistor Ra are.

The thermistor according to the present embodiment is a negative temperature coefficient (NTC) thermistor and includes a temperature-sensitive resistor whose resistance value Rth decreases as the temperature increases.

The NTC thermistor that can be used has, for example, a resistance value Rth ranging from 1 kΩ to 100 kΩ at 25° C., and a B constant (25° C./85° C.) ranging from 3000 K to 5000 K. The resistance value Rth at 25° C. and the resistance value Ra at 25° C. are preferably at the same level. The resistance value Rth at 25° C. of the NTC thermistor used in the present embodiment is 10 kΩ, and the resistance value Ra at 25° C. is 10 kW.

In the measurement temperature range (e.g., −40° C. to +120° C.), the amount of change in resistance value Ra with respect to temperature change is sufficiently smaller than the amount of change in resistance value Rth.

Each switch is not limited to a particular type, and may be any component capable of switching the current between the on-state and the off-state, or component capable of changing the direction of current flow. For example, various transistors or relay switches can be used as the switches Sw1 to Sw4. Examples of the transistors that can be used include bipolar transistors, field-effect transistors (FETs), and photransistors. Here, the on-state refers to a state where the current flows from the power side to the ground side through the switch, and the off-state refers to a state where the flow of current through the switch is virtually shut off.

The present embodiment will now be described in further detail.

Figure 1:
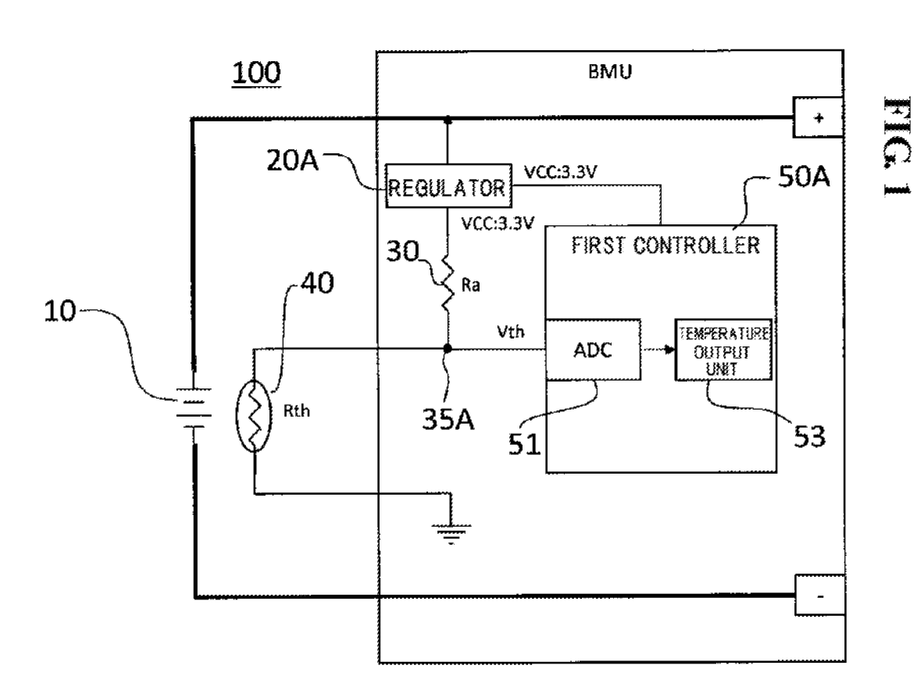
FIG. 1 illustrates a temperature detecting apparatus using a thermistor.

First, a typical temperature detecting apparatus using a thermistor is illustrated in FIG. 1. In a temperature detecting apparatus 100 illustrated in FIG. 1, a regulator 20A using a battery 10 as a power source supplies a voltage Vcc of 3.3 V to a series circuit composed of a resistor 30 having a resistance value Ra and connected to the power side and a thermistor 40 having a resistance value Rth and connected to the ground side. The temperature measurement and the temperature output carried out by the temperature detecting apparatus 100 are controlled by a first controller 50A. The first controller 50A includes an A/D converter 51 (ADC) configured to convert a potential at a first node 35A between the resistor 30 and the thermistor 40 into a digital value, and a temperature output unit 53 configured to convert the digital value into a temperature and output the temperature.

In this example, the temperature detecting apparatus 100 is applied to a battery management unit (BMU) that monitors the temperature of the battery 10. Accordingly, the thermistor 40 is disposed near the battery 10. In the temperature detecting apparatus 100 illustrated in FIG. 1, an output voltage Vth to the A/D converter 51 (i.e., potential at the first node 35A) is given by Eq. (1).

$$Vth = Rth \times Vcc/(Ra+Rth) \qquad (1)$$

Figure 2:
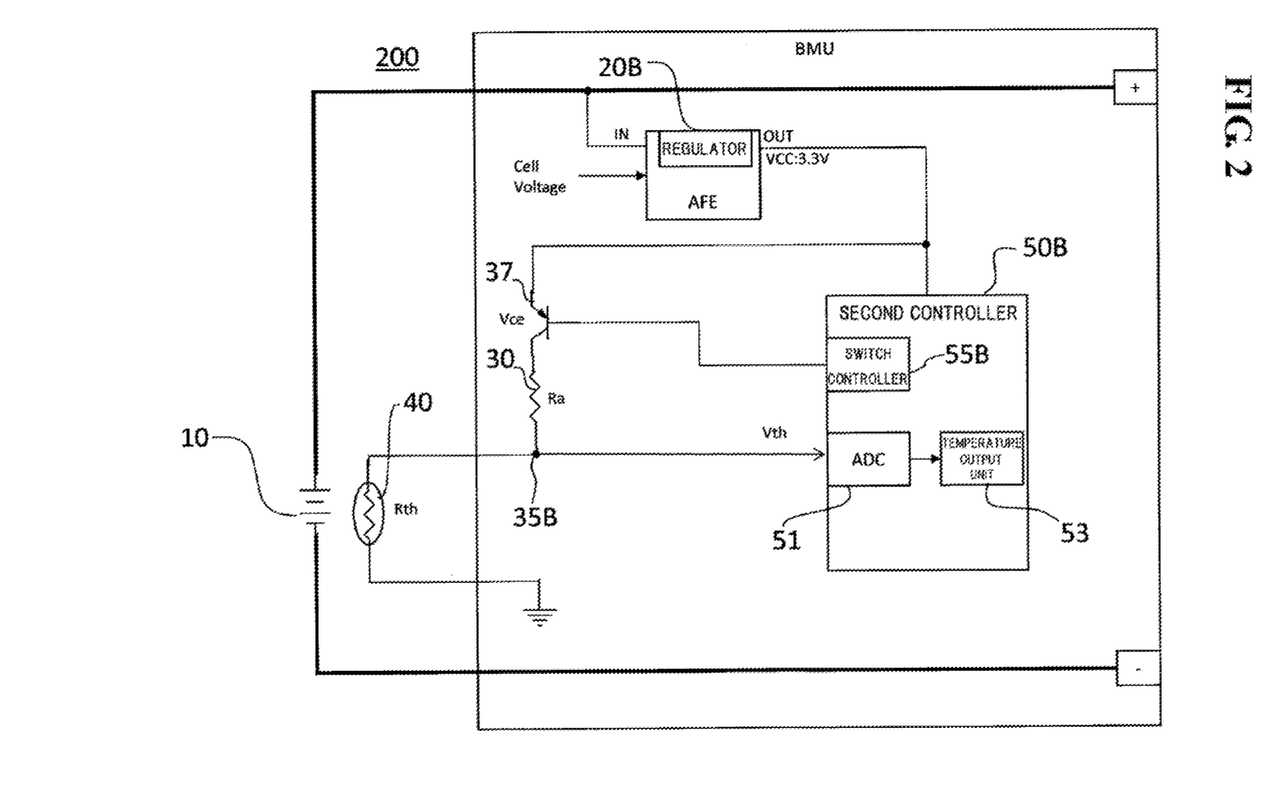
FIG. 2 illustrates a modification of the apparatus illustrated in FIG. 1.
Figure 3:
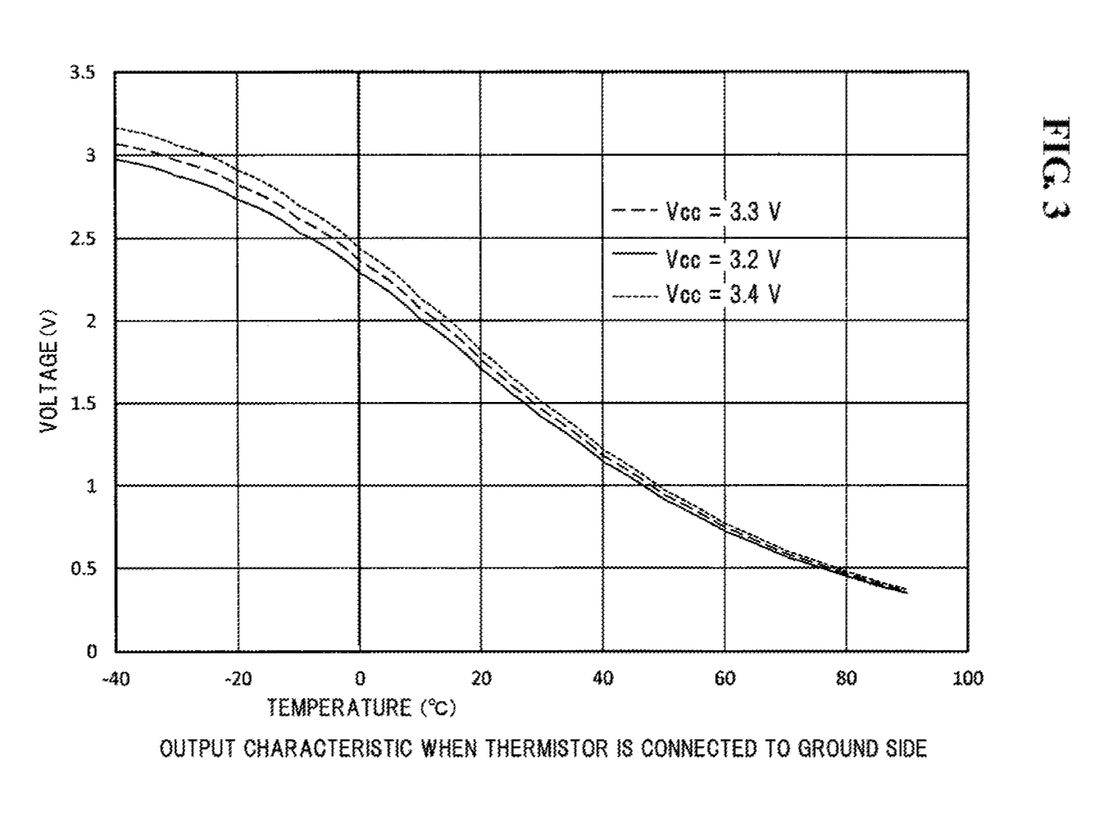
FIG. 3 is a characteristic diagram showing a relationship between output voltage Vth to an analog-to-digital converter (ADC) (i.e., potential at a first node) and temperature in the temperature detecting apparatus illustrated in FIG. 2.

FIG. 2 illustrates a configuration of another temperature detecting apparatus. A temperature detecting apparatus 200 illustrated in FIG. 2 includes an analog front end (AFE) 20B, which includes a regulator. The battery 10 serves as a power source. The regulator supplies a voltage Vcc of 3.3 V to the series circuit of the resistor 30 and the thermistor 40. The thermistor 40 is connected to the ground side, and the resistor Ra is connected to the power side. A transistor 37 serving as a switch element is connected between the power source (or AFE 20B) and the resistor Ra connected to the power side. The transistor 37 is in the on-state only during temperature measurement, and this reduces power consumption. The temperature measurement and the temperature output carried out by the temperature detecting apparatus 200 are controlled by a second controller 50B. The second controller 50B includes the A/D converter 51 configured to convert a potential at a first node 35B between the resistor 30 and the thermistor 40 into a digital value, the temperature output unit 53 configured to convert the digital value into a temperature and output the temperature, and a switch controller 55B configured to control the on and off of the transistor 37. When the transistor 37 is in the on-state, the output voltage Vth to the A/D converter 51 (i.e., potential at the first node 35B) in the temperature detecting apparatus 200 illustrated in FIG. 2 is given by Eq. (2), where Vce is a collector-emitter voltage. The relationship between the output voltage Vth to the A/D converter 51 (i.e., potential at the first node 35B) and the temperature is shown in FIG. 3.

$$Vth = Rth \times (Vcc-Vce)/(Ra+Rth) \qquad (2)$$

The output voltage of the regulator included in the AFE 20B varies. For example, when the variation is ±3%, 3.3 V varies within ±0.1 V. FIG. 3 takes the variation into account and shows examples where the voltage Vcc is 3.2 V, 3.3 V, and 3.4 V. As can be seen in FIG. 3, when the resistor 30 is connected closer to the power side than the thermistor 40 is, the variation of the voltage Vcc causes a large variation in the output voltage Vth to the A/D converter 51 (i.e., potential at the first node 35B) on the low temperature side. This means that on the low temperature side, the accuracy of temperature measurement is low and an error in measured temperature is large. For example, the margin of error is about ±1° C. at 60° C., but is about ±5° C. at −20° C.

Although the output voltage Vcc of the regulator is 3.3 V in this example, Vcc may be a voltage ranging from 1 V to 12 V. Although the variation of the output voltage Vcc of the regulator is ±3% (i.e., the variation is ±0.1 V in the case of Vcc=3.3 V) here, the variation of Vcc may range, for example, from ±2% to ±5% (i.e., the variation may range from ±0.066 V to ±0.17 V in the case of Vcc=3.3 V).

Figure 4:
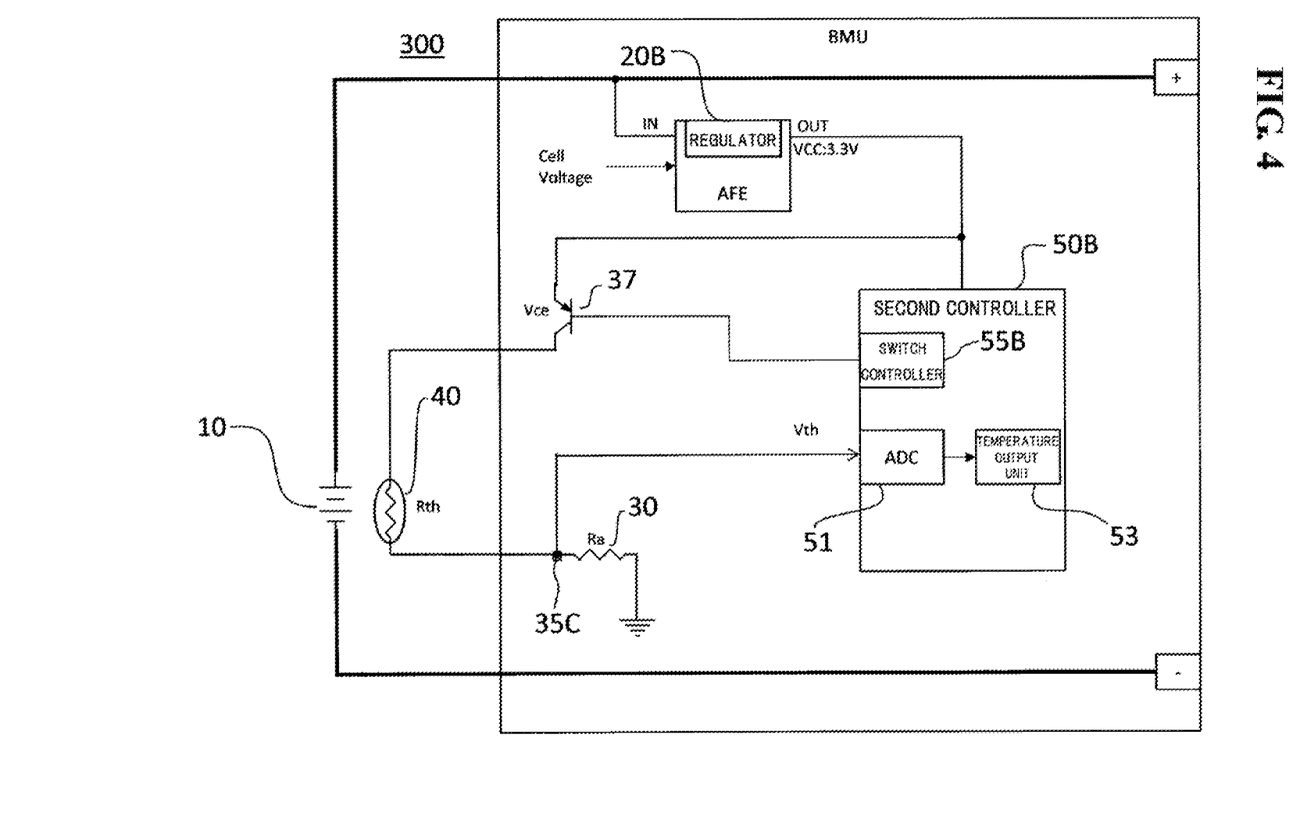
FIG. 4 illustrates another modification of the apparatus illustrated in FIG. 1.

FIG. 4 illustrates a configuration of another temperature detecting apparatus. In a temperature detecting apparatus 300 illustrated in FIG. 4, the resistor 30 is connected closer to the ground side than the thermistor 40 is. Except this, the configuration of the temperature detecting apparatus 300 is the same as that of the apparatus illustrated in FIG. 2. In this case, the output voltage Vth to the A/D converter 51 (i.e., potential at a first node 35C) is given by Eq. (3). The relationship between the output voltage Vth to the A/D converter 51 (i.e., potential at the first node 35C) and the temperature is shown in FIG. 5.

$$Vth = Ra \times (Vcc - Vce)/(Ra + Rth) \quad (3)$$

Figure 5:
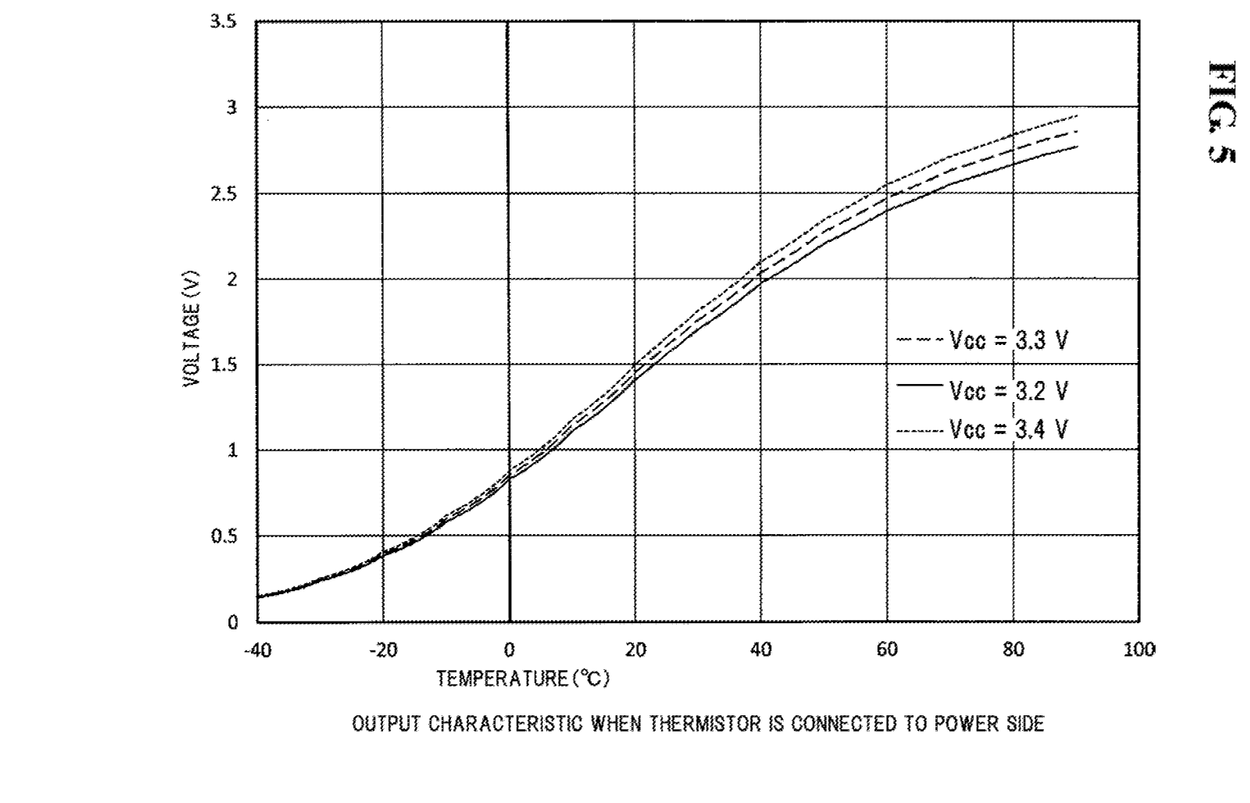
FIG. 5 is a characteristic diagram showing a relationship between output voltage Vth to the ADC (i.e., potential at the first node) and temperature in the temperature detecting apparatus illustrated in FIG. 4.

As can be seen in FIG. 5, the temperature characteristic is opposite that shown in FIG. 3, and the output voltage Vth to the A/D converter 51 (i.e., potential at the first node 35C) varies significantly on the high temperature side. This means that on the high temperature side, the accuracy of temperature measurement is low and an error in measured temperature is large. For example, the margin of error is about ±5° C. at 60° C., but is about ±1° C. at −20° C.

Figure 6:
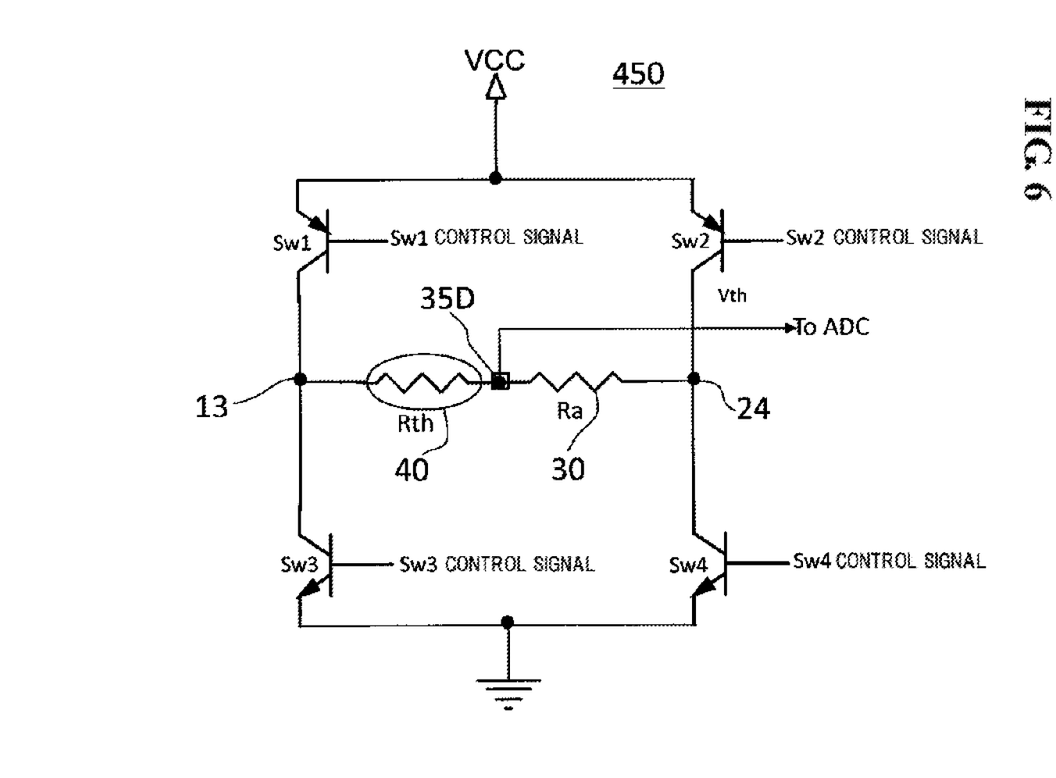
FIG. 6 illustrates a switch circuit according to an embodiment of the present invention.
Figure 7:
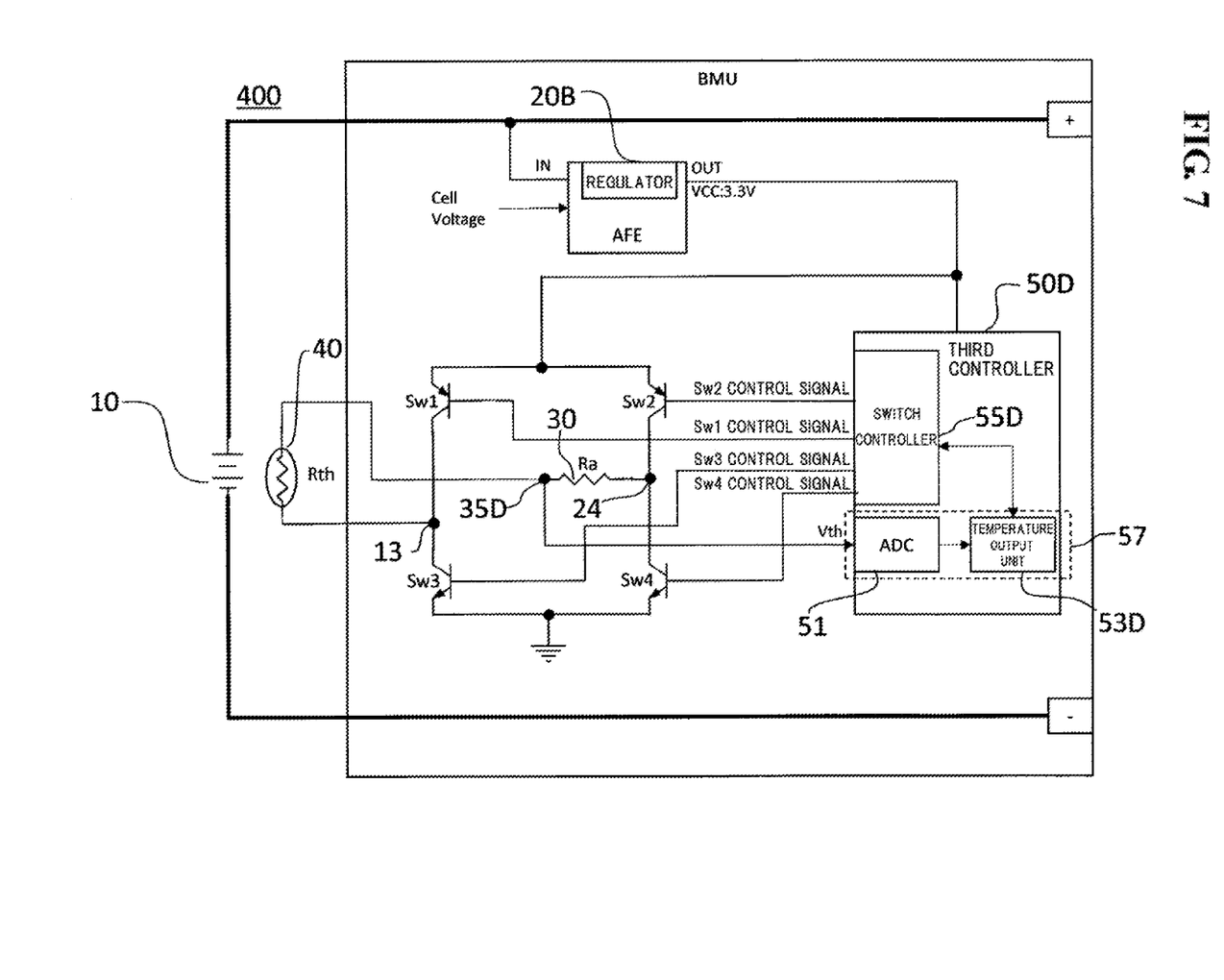
FIG. 7 illustrates a configuration of a temperature detecting apparatus according to an embodiment of the present invention.

FIG. 6 illustrates a switch circuit according to an embodiment of the present invention. FIG. 7 illustrates a configuration of a temperature detecting apparatus 400 including a switch circuit 450 illustrated in FIG. 6, according to the embodiment of the present invention. The temperature detecting apparatus 400 includes the resistor 30 having the resistance value Ra, the thermistor 40 connected in series to the resistor 30, the switch circuit 450 configured to control the state of power supply to the resistor 30 and the thermistor 40, the A/D converter 51 connected to a first node 35D between the resistor 30 and the thermistor 40, and a temperature output unit 53D configured to convert a digital value output from the A/D converter 51 into a temperature and output the temperature. The A/D converter 51 and the temperature output unit 53D form a temperature detector 57. The temperature detecting apparatus 400 includes the AFE 20B. The AFE 20B includes a regulator configured to supply power to the thermistor 40. The battery 10 serves as a power source.

The switch circuit 450 includes a series circuit composed of the switch Sw1 and the switch Sw3 (first series circuit) and a series circuit composed of the switch Sw2 and the switch Sw4 (second series circuit). The first series circuit and the second series circuit are connected in parallel. The switch Sw1 of the first series circuit and the switch Sw2 of the second series circuit are connected to the power side, and the switch Sw3 of the first series circuit and the switch Sw4 of the second series circuit are connected to the ground side. The thermistor 40 is connected to a second node 13 between the switch Sw1 and the switch Sw3 of the first series circuit, and the resistor 30 is connected to a third node 24 between the switch Sw2 and the switch Sw4 of the second series circuit.

In the temperature detecting apparatus 400, the regulator included in the AFE 20B supplies a voltage Vcc of 3.3 V to the series circuit of the resistor 30 and the thermistor 40. By operating the four switch elements included in the switch circuit 450, the potential at each of the second node 13 and the third node 24 can be switched between high and low. That is, when the switch Sw2 and the switch Sw3 are in the on-state and the switch Sw1 and the switch Sw4 are in the off-state (first state), the third node 24 is on the power side and the second node 13 is on the ground side. On the other hand, when the switch Sw2 and the switch Sw3 are in the off-state and the switch Sw1 and the switch Sw4 are in the on-state (second state), the third node 24 is on the ground side and the second node 13 is on the power side.

When the switch Sw1 and the switch Sw2 are both in the off-state, or the switch Sw3 and the switch Sw4 are both in the off-state, no current flows through the switch circuit 450. That is, by operating a plurality of switch elements included in the switch circuit 450, the timing of temperature measurement can be controlled. Power is thus consumed only during temperature measurement.

The operation of each of the four switch elements included in the switch circuit 450 is controlled by a switch controller 55D. The switch controller 55D is configured to be capable of switching each of the switch Sw1, the switch Sw2, the switch Sw3, and the switch Sw4 between the on-state and the off-state with an independent control signal. That is, the switch controller 55D is capable of outputting, at any timing, an Sw1 control signal for controlling on and off of the switch Sw1. Similarly, the switch controller 55D is capable of outputting, at any timing, an Sw2 control signal, an Sw3 control signal, and an Sw4 control signal for controlling on and off of the switch Sw2, the switch Sw3, and the switch Sw4, respectively.

The temperature measurement and the temperature output carried out by the temperature detecting apparatus 400 are controlled by a third controller 50D. The third controller 50D includes not only the switch controller 55D, but also the A/D converter 51 configured to convert a potential at the first node 35D between the resistor 30 and the thermistor 40 into a digital value, and the temperature output unit 53D configured to convert the digital value into a temperature and output the temperature. The temperature output unit 53D includes various calculation functions for processing digital values, and a memory. The third controller 50D can be configured to receive power supply from the battery 10 through the AFE 20B. The configuration of the third controller 50D is not limited to that described above.

As described above, in the temperature detecting apparatus 400, turning on and off the four transistors makes it possible to make a switch between a state where the thermistor 40 is connected to the ground side and the resistor 30 is connected to the power side, and a state where the thermistor 40 is connected to the power side and the resistor 30 is connected to the ground side. When the switch circuit 450 is in the first state, the third node 24 is on the power side and the second node 13 is on the ground side. In this case, an output voltage Vth1 to the A/D converter 51 (i.e., potential at the first node 35D between the resistor 30 and the thermistor 40) is given by Eq. (4). Note that a collector-emitter voltage obtained when each transistor is in the on-state is represented by Vce. The relationship between temperature and Vth1 is substantially the same as that shown in FIG. 3. That is, as the temperature of the temperature measured object decreases, the numerator in Eq. (4) increases and the impact of variation of Vcc increases. Moreover, when the temperature of the temperature measured object is on the low temperature side, the slope of the curve is small and the impact of variation of Vcc is large.

$$Vth1 = Rth \times (Vcc - 2Vce)/(Ra + Rth) \quad (4)$$

On the other hand, when the switch circuit 450 is in the second state, the second node 13 is on the power side and the third node 24 is on the ground side. In this case, an output voltage Vth2 to the A/D converter 51 (i.e., potential at the first node 35D) is given by Eq. (5), and the relationship between temperature and Vth2 is substantially the same as that shown in FIG. 5. That is, as the temperature of the temperature measured object increases, the denominator in Eq. (5) decreases and the impact of variation of Vcc increases. Moreover, when the temperature of the temperature measured object is on the high temperature side, the slope of the curve is small and the impact of variation of Vcc is large.

$$Vth2 = Ra \times (Vcc - 2Vce)/(Ra + Rth) \quad (5)$$

A comparison between Eqs. (2) and (3) and Eqs. (4) and (5) shows that (Vcc−Vce) in Eqs. (2) and (3) is replaced by (Vcc−2Vce) in Eqs. (4) and (5). Since Vce is much smaller than Vcc, a difference between Vth in Eq. (2) and Vth1 in Eq. (4) and a difference between Vth in Eq. (3) and Vth2 in Eq. (5) are negligible. That is, in the switch circuit illustrated in FIG. 6, a change in potential at the first node caused by an increase in the number of transistors from that in the circuit illustrated in FIG. 2 or 4 is negligible.

Figure 8:
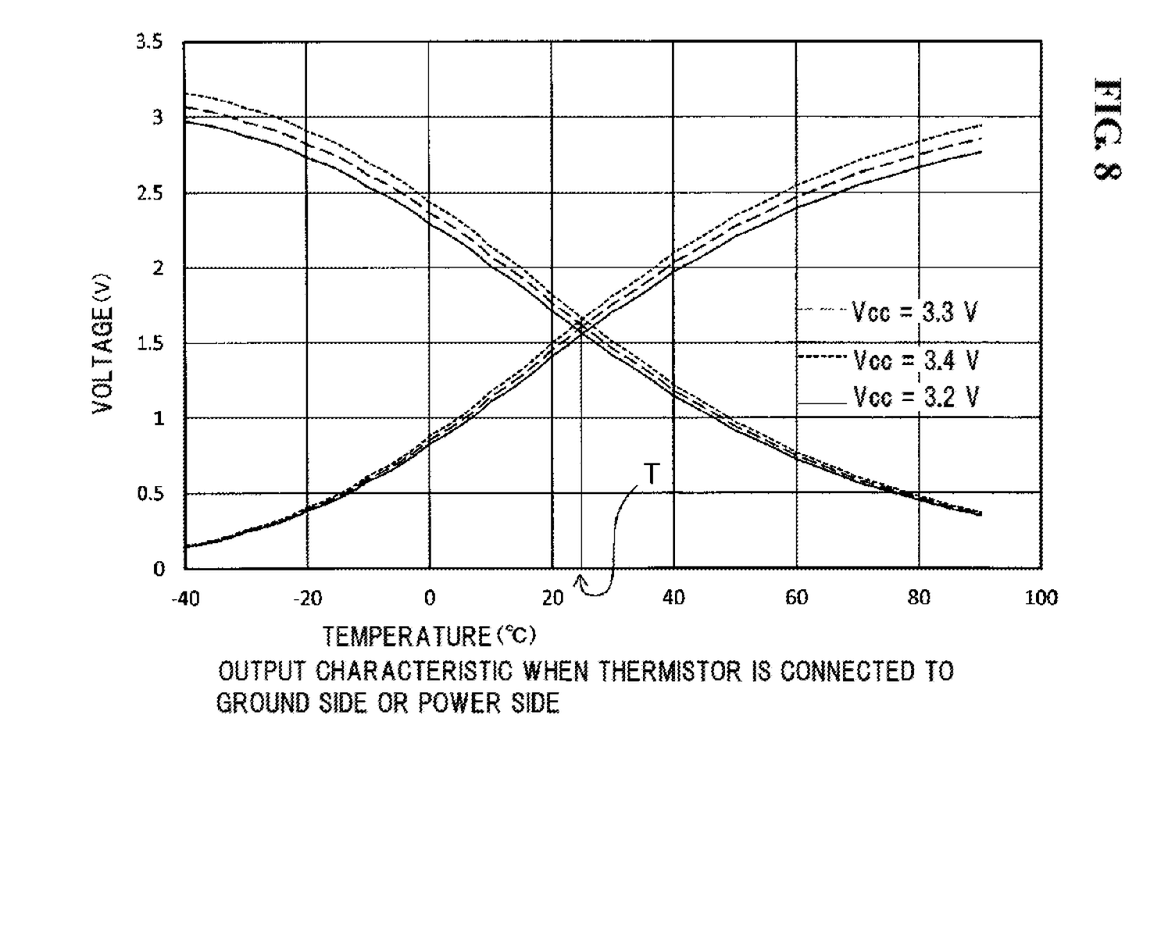
FIG. 8 is a characteristic diagram which combines the characteristic diagrams of FIGS. 3 and 5 into one.

FIG. 8 is a characteristic diagram which combines the characteristic diagrams of FIGS. 3 and 5 into one. As can be seen in FIG. 8, to improve the accuracy of temperature measurement in a wide temperature range, it is preferable to switch the state of the switch circuit 450 at a temperature T ° C. (25° C. in the drawing) at which the potential at the first node in the first state of the switch circuit is equal to the potential at the first node in the second state of the switch circuit.

If the temperature of the thermistor 40 is in a high temperature range higher than or equal to a predetermined threshold temperature, the switch controller 55D controls the switch circuit 450 such that the switch Sw2 and the switch Sw3 are in the on-state and the switch Sw1 and the switch Sw4 are in the off-state. The potential Vth1 given by Eq. (4) is thus output to the A/D converter 51.

On the other hand, if the temperature of the thermistor 40 is in a low temperature range lower than the threshold temperature, the switch controller 55D controls the switch circuit 450 such that the switch Sw1 and the switch Sw4 are in the on-state and the switch Sw2 and the switch Sw3 are in the off-state. The potential Vth2 given by Eq. (5) is thus output to the A/D converter 51.

For example, the switch controller 55D transmits a signal related to the state of the switch circuit 450 to the temperature output unit 53D regularly or at any timing. The switch controller 55D may transmit a signal related to the state of the switch circuit 450 to the temperature output unit 53D, for example, at specific time intervals or every time it transmits a control signal to the switch circuit. The switch controller 55D may be configured to always transmit a signal related to the state of the switch circuit 450 to the temperature output unit 53D immediately after start-up.

The temperature output unit 53D transmits temperature information or a signal necessary for switching the switch circuit 450 to the switch controller 55D regularly or at any timing. On the basis of the signal transmitted from the switch controller 55D, the temperature output unit 53D can determine which of a first temperature and a second temperature is to be output. The temperature output unit 53D may transmit temperature information (thermistor temperature information) or a signal necessary for switching the switch circuit 450 to the switch controller 55D, for example, at specific time intervals or every time it receives a digital value output from the A/D converter 51.

Figure 9:
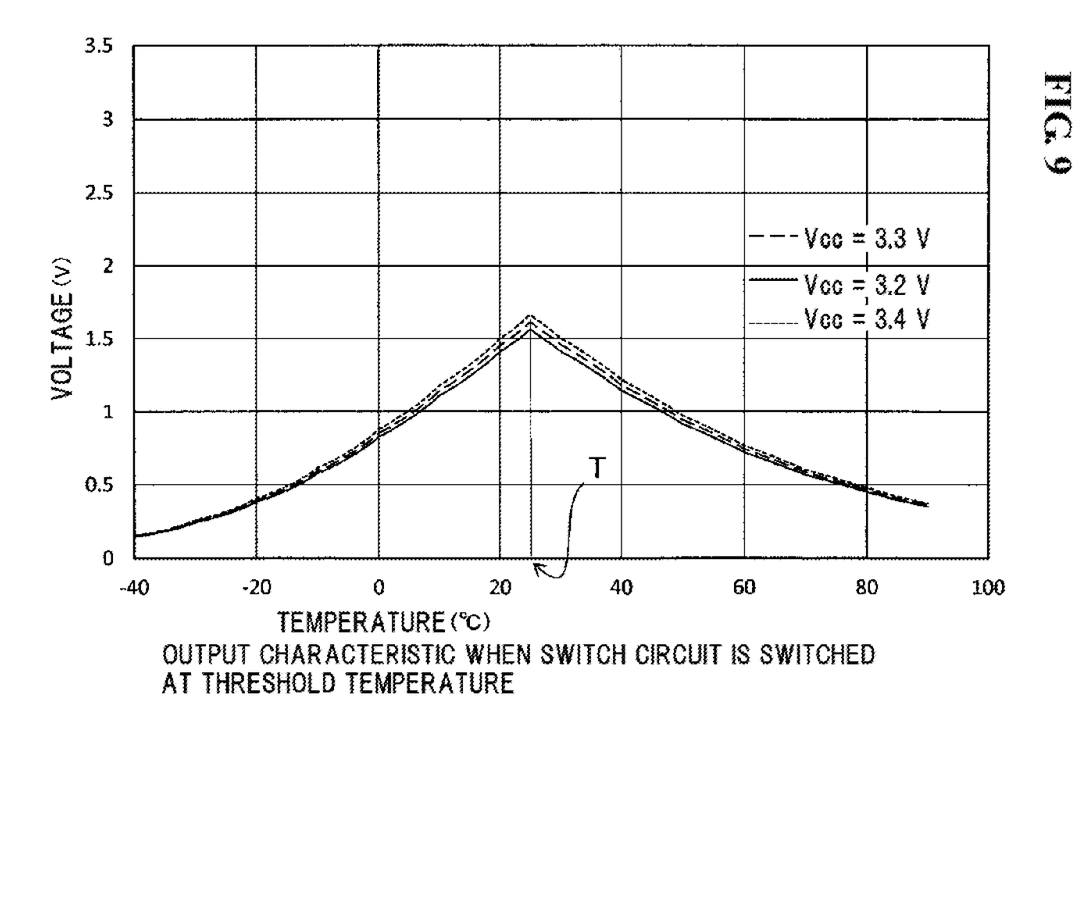
FIG. 9 is a characteristic diagram showing a relationship between output voltage Vth to the ADC (i.e., potential at the first node) and temperature when switching between a first state and a second state of the switch circuit takes place at a threshold temperature.

In the switch circuit 450 illustrated in FIG. 6, when Sw1 to Sw4 are switched on or off at an intersection temperature T ° C. (25° C. in FIG. 9) as described above, the relationship between the output voltage Vth to the A/D converter 51 (i.e., potential at the first node 35D) and the temperature is as shown in FIG. 9. FIG. 9 shows that an error in the temperature of the thermistor 40 is maximized at the intersection temperature T ° C., but the maximum margin of error is only about ±1.5° C.

As can be seen in the characteristic diagram of FIG. 8 or 9, two temperatures correspond to the same voltage, except at the intersection temperature T ° C. That is, except at the intersection temperature T ° C., the temperature output unit 53D identifies two temperatures, the first temperature and the second temperature, from a digital value output from the A/D converter 51. Since the third controller 50D controls the switch circuit 450, the third controller 50D recognizes which of the first state and the second state the switch circuit 450 is in. Therefore, it is easy for the temperature output unit 53D to determine which of the first temperature and the second temperature is to be output.

On the basis of a digital value output from the A/D converter 51, the first temperature and the second temperature are retrieved, for example, from data tables that are related to a first characteristic diagram and a second characteristic diagram and stored in the memory included in the temperature output unit 53D. The data table related to the first characteristic diagram (i.e., data table based on a curve representing the relationship between the potential at the first node and the temperature of the thermistor in the first state of the switch circuit) is referred to as a first data table, and the data table related to the second characteristic diagram (i.e., data table based on a curve representing the relationship between the potential at the first node and the temperature of the thermistor in the second state of the switch circuit) is referred to as a second data table. If the switch Sw2 and the switch Sw3 are in the on-state and the switch Sw1 and the switch Sw4 are in the off-state (i.e., if the switch circuit 450 is in the first state), the temperature output unit 53D outputs from the first data table the first temperature corresponding to the digital value output from the A/D converter 51. On the other hand, if the switch Sw1 and the switch Sw4 are in the on-state and the switch Sw2 and the switch Sw3 are in the off-state (i.e., if the switch circuit 450 is in the second state), the temperature output unit 53D outputs from the second data table the second temperature corresponding to the digital value output from the A/D converter 51.

That is, the temperature detecting apparatus according to the present embodiment is preferably a temperature detecting apparatus that includes a memory. The memory stores a first data table and a second data table; the first data table is a data table showing the relationship between the potential at the first node and the temperature of the thermistor in the first state of the switch circuit; the second data table is a data table showing the relationship between the potential at the first node and the temperature of the thermistor in the second state of the switch circuit; the first temperature is a temperature corresponding to the digital value in the first data table; the second temperature is a temperature corresponding to the digital value in the second data table; and the temperature output unit selects and outputs the first temperature when the switch circuit is in the first state, and selects and outputs the second temperature when the switch circuit is in the second state.

At the start-up of the temperature detecting apparatus 400, the switch circuit 450 may be either in the first state or in the second state. When the switch circuit 450 is in the first state and the temperature of the temperature measured object is lower than the threshold temperature, or when the switch circuit 450 is in the second state and the temperature of the temperature measured object is higher than or equal to the threshold temperature, the temperature output from the temperature output unit 53D may have a relatively large error. However, the state of the switch circuit 450 is corrected as described below in accordance with the temperature of the temperature measured object.

At the start-up of the temperature detecting apparatus 400, the switch controller 55D transmits a signal related to the state of the switch circuit 450 to the temperature output unit 53D. If the switch circuit 450 is in the first state, the temperature output unit 53D determines, in the first data table, a temperature corresponding to a digital value output by the A/D converter 51 as an initial temperature. If the initial temperature is higher than or equal to the threshold temperature, there is no need to switch the state of the switch circuit 450. If the initial temperature is lower than the threshold temperature, the switch circuit 450 needs to be switched to the second state. In this case, the temperature output unit 53D transmits temperature information or a signal indicating the switching of the switch circuit 450 to the switch controller 55D, which switches the switch circuit 450 to the second state. A similar operation is performed if the switch circuit 450 is in the second state at the start-up of the temperature detecting apparatus 400, and the initial temperature is higher than or equal to the threshold temperature.

Also, a similar operation is performed if, after start-up of the temperature detecting apparatus 400, the switch circuit 450 is in the first state and the temperature of the temperature measured object is lower than the threshold temperature, or the switch circuit 450 is in the second state and the temperature of the temperature measured object is higher than or equal to the threshold temperature.

The temperature output unit 53D may either output or not output the first or second temperature selected by the temperature output unit 53D immediately before switching of the switch circuit 450 to the first or second state (i.e., the temperature selected by the temperature output unit 53D when the switch circuit 450 is not in the state appropriate for the temperature). The temperature detecting apparatus 400 may be configured to always perform a temperature measuring operation immediately after switching of the switch circuit 450 to the first or second state.

The threshold temperature is preferably set to be equal to the intersection temperature T ° C. as much as possible. The threshold temperature is preferably a temperature ranging from T−5° C. to T+5° C., more preferably a temperature ranging from T−1° C. to T+1° C., and is even more preferably T ° C. With the threshold temperature set as described above, more accurate temperature detection is possible in a wide temperature range. If the threshold temperature is set to T ° C., the measurement accuracy (temperature measurement error) can be made continuous throughout the entire measurement temperature range. If the threshold temperature is not T ° C., the measurement accuracy (temperature measurement error) may become discontinuous at the threshold temperature. However, as long as the threshold temperature is a temperature ranging from T−5° C. to T+5° C. or from T−1° C. to T+1° C., the degree of discontinuity in the measurement accuracy (temperature measurement error) can be made sufficiently small.

The resistance value Ra of the resistor connected in series to the thermistor at 25° C. preferably ranges from 1/10 to 10 times the resistance value Rth of the thermistor at 25° C., more preferably ranges from 1/5 to 5 times, and even more preferably ranges from 1/2 to 2 times. The resistance value Ra at 25° C. is most preferably equal to the resistance value Rth at 25° C. This makes it possible to achieve more accurate temperature detection in a wide temperature range.

The temperature detecting apparatus according to the present embodiment can accurately detect the temperature of the temperature measured object in a wide temperature range (e.g., −40° C. to +80° C., −40° C. to +100° C., or −40° C. to +120° C.). For example, the temperature can be detected with a margin of error of ±3° C., ±2° C., or ±1.5° C.

INDUSTRIAL APPLICABILITY

According to the embodiments of the present invention, it is possible to provide a temperature detecting apparatus that can achieve accurate temperature detection in a wide temperature range.

REFERENCE SIGNS LIST

10: battery, 13: second node, 20A: regulator, 20B: AFE, 24: third node, 30: resistor, 35A, 35B, 35C, 35D: first node, 37: transistor, 40: thermistor, 50A: first controller, 50B: second controller, 50D: third controller, 51: A/D converter, 53, 53D: temperature output unit, 55B, 55D: switch controller, 57: temperature detector, 100, 200, 400: temperature detecting apparatus, 450: switch circuit

The invention claimed is:

1. A temperature detecting apparatus comprising:
a thermistor;
a resistor connected in series to the thermistor;
a temperature detector comprising an analog-to-digital converter connected to a first node between the thermistor and the resistor, and a temperature output unit configured to convert a digital value output from the analog-to-digital converter to a temperature; and
a switch circuit including a first switch, a second switch, a third switch, and a fourth switch; and
a switch controller configured to switch each of the first switch, the second switch, the third switch, and the fourth switch between an on-state and an off-state with an independent control signal,
wherein the first switch and the third switch are connected in series;
the second switch and the fourth switch are connected in series;
the first switch and the second switch are directly connected to a power side;
the third switch and the fourth switch are directly connected to a ground side;
the thermistor is connected to a second node between the first switch and the third switch; and
the resistor is connected to a third node between the second switch and the fourth switch, and
wherein the temperature detector is adapted to receive a signal related to a state of the switch circuit from the switch controller, determine a temperature corresponding to a digital value output by the analog-to-digital converter as a temperature of the thermistor, and compare the temperature of the thermistor to a predetermined threshold temperature to determine whether to send a signal indicating switching of the switch circuit to the switch controller.

2. The temperature detecting apparatus according to claim 1, wherein if the temperature of the thermistor is higher than or equal to the predetermined threshold temperature, the switch controller controls the switch circuit to be in a first state where the second switch and the third switch are in the on-state and the first switch and the fourth switch are in the off-state; and if the temperature of the thermistor is lower than the predetermined threshold temperature, the switch controller controls the switch circuit to be in a second state where the first switch and the fourth switch are in the on-state and the second switch and the third switch are in the off-state.

3. The temperature detecting apparatus according to claim 2, wherein when a temperature at which a potential at the first node in the first state of the switch circuit is equal to a potential at the first node in the second state of the switch circuit is T° C., the threshold temperature is a temperature ranging from T−5° C. to T+5° C.

4. The temperature detecting apparatus according to claim 2, wherein the temperature output unit identifies a first temperature and a second temperature from the digital value output from the analog-to-digital converter, and selects and outputs one of the first temperature and the second temperature on the basis of the state of the switch circuit.

* * * * *